US009002978B2

United States Patent
Li et al.

(10) Patent No.: US 9,002,978 B2
(45) Date of Patent: Apr. 7, 2015

(54) CONTENT DELIVERY PREDICTION AND FEEDBACK SYSTEMS

(75) Inventors: Ming Li, Beijing (CN); Philip Lin, Stateline, NV (US)

(73) Assignee: Ming Li, Beijing (CN)

( * ) Notice: Subject to any disclaimer, the term of this patent is extended or adjusted under 35 U.S.C. 154(b) by 310 days.

(21) Appl. No.: 13/179,155

(22) Filed: Jul. 8, 2011

(65) Prior Publication Data
US 2013/0013730 A1    Jan. 10, 2013

(51) Int. Cl.
G06F 15/16 (2006.01)
H04L 29/12 (2006.01)
H04L 29/06 (2006.01)

(52) U.S. Cl.
CPC ............ *H04L 61/1511* (2013.01); *H04L 65/80* (2013.01)

(58) Field of Classification Search
USPC .......................... 709/217, 218–219, 223–226; 340/1.1–16.1
See application file for complete search history.

(56) References Cited

U.S. PATENT DOCUMENTS

| 7,274,658 | B2 * | 9/2007 | Bornstein et al. | 370/227 |
| 7,639,630 | B2 * | 12/2009 | Healy et al. | 370/252 |
| 7,743,132 | B2 * | 6/2010 | Tewari et al. | 709/223 |
| 7,991,881 | B2 * | 8/2011 | Qian et al. | 709/224 |
| 2002/0052942 | A1 * | 5/2002 | Swildens et al. | 709/223 |

* cited by examiner

*Primary Examiner* — Ruolei Zong

(57) ABSTRACT

A content delivery network aggregator system is disclosed. A user requesting content from a content provider has his or her DNS request forwarded to a CDN selector. The CDN selector intelligently selects an optimal CDN from amongst a number of partner CDNs to provide the requested content. The CDN selector selects one of the plurality of content delivery networks for providing content to a user based upon an analysis of a plurality of performance variables for each of the plurality of content delivery networks.

19 Claims, 5 Drawing Sheets

CONTENT DELIVERY PREDICTION AND FEEDBACK SYSTEMS

BACKGROUND

1. Field of the Invention

Embodiments of the present invention generally relate to content delivery networks, and more particularly to the intelligent selection of an optimal content delivery network in a content delivery network aggregator system.

2. Description of the Related Art

Today, users can access the Internet to interact with various web sites that offer up-to-date news, reports, real-time information, games, business functions, social interfaces, search functions, telepresence, etc. Users can surf the web, download files, play games, watch streaming movies, listen to music, shop, trade stocks, take educational courses, communicate, etc. Behind all of the myriad options available over the Internet is an evolving, rapidly growing, enormous amount of content and information in the form of text, graphics, audio, video, multi-media, data, web objects, applications, real-time streams, and other content capable of internet delivery.

All of this content is typically stored on servers, which are basically powerful computers that are specially designed to store and provide or "serve" the requested content to the end users. In its infancy, the Internet was primarily limited to users accessing the particular server that contained the content of interest. Each and every user desiring that particular content, would necessarily have to request the content from the specific, dedicated server hosted by that particular content provider. This methodology proved to be flawed, in part, because users tend to be geographically dispersed. Users that are located closer to the server may receive the content relatively quickly. However, those users that are geographically remote or more distant from the server may have to wait a while for the content to be transmitted and routed through the Internet before reaching their computers. This increased latency is highly undesirable because users are forced to wait for a web page to load or for the content to be downloaded. Furthermore, simply coupling additional servers to a network backbone can cause that particular backbone to become saturated. In other words, a section of the Internet may have too much data being transmitted over it and thereby, acts as a bottleneck. Again, delivery of content is slowed down as a result.

In an effort to improve content deliver performance, content providers have implemented their own content delivery networks or content distribution networks (CDNs). Basically, a content delivery network is a group of computers and/or servers networked together via the Internet that cooperate amongst themselves to transparently deliver the content to various users in a more expeditious manner. One of the keys to CDNs is the use of strategically placed edge servers (also known as POP servers, ghost servers, cache servers, web servers, or any combination of hardware or software designed to provide services to client computers). These edge servers are typically located to provide improved geographical coverage corresponding to the end users. Hence, a user in one city (e.g., New York) may access an edge server closer to his or her location, whereas another user in a different city (e.g., Tokyo) may access an edge server closer to his or her location; and a user in another part of the world (e.g., Paris), may access a separate, different edge server which is situated in a nearby location.

In general, the CDN design of placing edge servers closer to end users means that the data packets do not have to be transmitted as far. In addition to distance, there may be other factors to consider, such as load conditions, server capacities, network bandwidths, etc., when selecting the most expeditious server for each individual user. The end result yields improvements in both latency and packet loss. From the users' perspective, they will experience faster and higher quality access to their requested content. Furthermore, if one edge server happens to malfunction, other edge servers can take over and service the requests. All of these benefits conferred by a CDN are of critical importance to the success of a content provider because users are more apt to visit their site if the content is faster, and richer, and more reliable. Increased Internet traffic to a site directly translates to more advertisement revenues.

Unfortunately, CDNs are rather expensive to install, upgrade, and maintain. The computing and network hardware can be quite expensive to purchase. It takes expert knowledge to build a CDN and also to upgrade an existing CDN. Furthermore, running, servicing, troubleshooting, and load-balancing a CDN can be quite daunting. In addition, CDNs can be notoriously inefficient. For example, a CDN for supporting a financial institution or governmental agency may be busy only during work hours; the same CDN would be grossly under-utilized at night, holidays, and weekends. Yet another downside inherent to CDNs is that it takes a relatively lengthy time to deploy a CDN. These days, content providers want to be first-to-market in order to capture a particular audience or user profile.

Although CDNs resolve some of the more immediate needs of content providers, the CDN concept still falls short in many areas.

SUMMARY

This Summary is provided to introduce a selection of concepts in a simplified form that are further described below in the Detailed Description. This Summary is not intended to identify key features or essential features of the claimed subject matter nor is it intended to be used to limit the scope of the claimed subject matter.

Embodiments of the present disclosure pertain to an apparatus and method for CDN selection through individual CDN performance predictions and objective end-user feedback for adjusting the CDN performance predictions. DNS requests from users are forwarded to a CDN aggregator. The CDN aggregator intelligently selects an optimal CDN from a number of partner CDNs for servicing these requests. The optimal CDN is selected based upon the adjusted CDN performance prediction values of the partner CDNs. The selected CDNs then provide the content to the respective users. In this manner, CDNs are selected for optimal usage.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

The present invention pertains to a CDN selector system as part of a content delivery/distribution network (CDN) aggregator.

The CDN aggregator is described in detail in U.S. patent application Ser. No. 13/178,828, entitled "CONTENT DELIVERY NETWORK AGGREGATION," filed on Jul. 8, 2011, which is incorporated by reference in its entirety herewith. In general, a number of hitherto disparate CDNs agree to form and be part of an affiliated network. The operator/owners of the CDNs that agree to participate in this network, will allow their network resources, such as their POP/edge servers and Domain Name Servers (DNS's), to be used by approved outside content providers. Under the CDN aggregator system, whenever an approved content provider receives a request for specific content by a user, the request is intelligently steered to be serviced by the best available CDN. The CDN selector system, which may also be utilized in individual CDNs as a POP/Edge server selector for selecting an optimal POP/edge server, will now be explained in detail.

Figure 1:
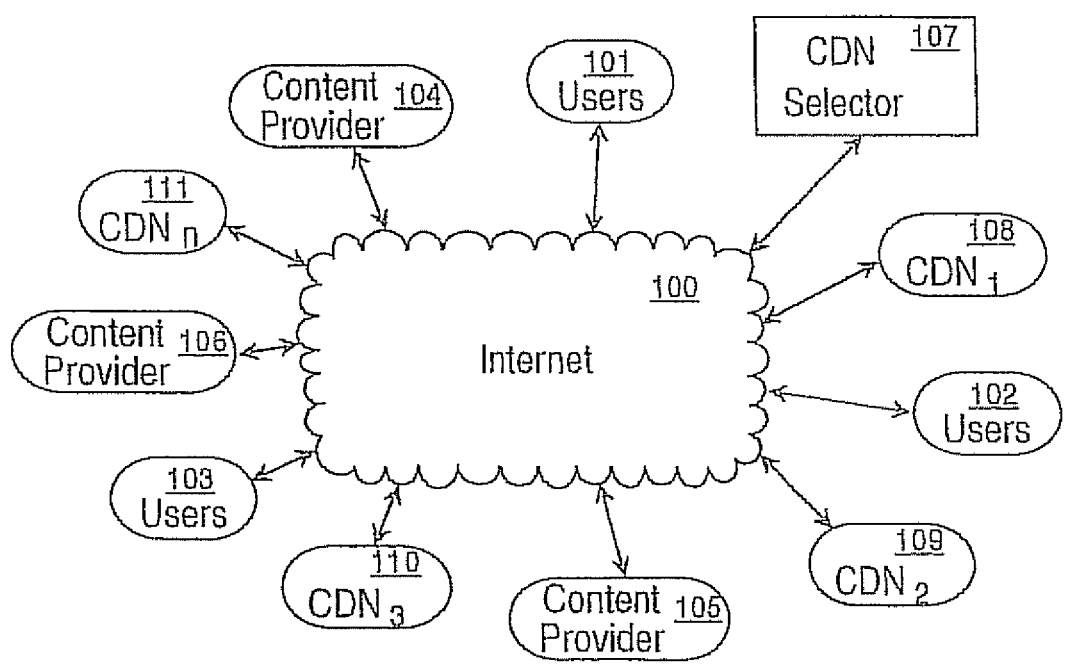
FIG. 1 shows a diagram of a CDN aggregator system.

Referring now to FIG. 1, a diagram of a CDN aggregator system is shown. Any number of users 101-103 situated in any number of locations, are interacting with any number of content providers 104-106 via the Internet 100. These content providers can be web sites that supply different types of online information (e.g., news, entertainment, weather reports, traffic conditions, job listings, financial data, etc.). The content providers can also offer online distribution of copyrighted materials (e.g., games, music, video, e-books, television broadcasts, etc.). The content providers can also be commercial sites (e.g., on-line merchants, social networking sites, auction sites, search engines, etc.). If a content provider is part of the CDN aggregator system, it directs its users' requests to the CDN selector 107. For each of these forwarded individual requests, the CDN selector 107 selects an optimal CDN from the group of CDNs, such as CDN 108-110, of the CDN aggregator system to service that particular request. The request is then forwarded to the selected CDN. In one embodiment, the CDN selector 107 contains software and information that is used to intelligently select the optimal CDN. The selection process can be accomplished heuristically, rule-based, adaptively, or algorithmically. The present invention encompasses all of the many, different ways by which a CDN can be selected. Once a CDN has been selected, the request is forwarded to that particular CDN. The requested content is then served back to the original user via the Internet 100 for display and/or download.

Figure 2:
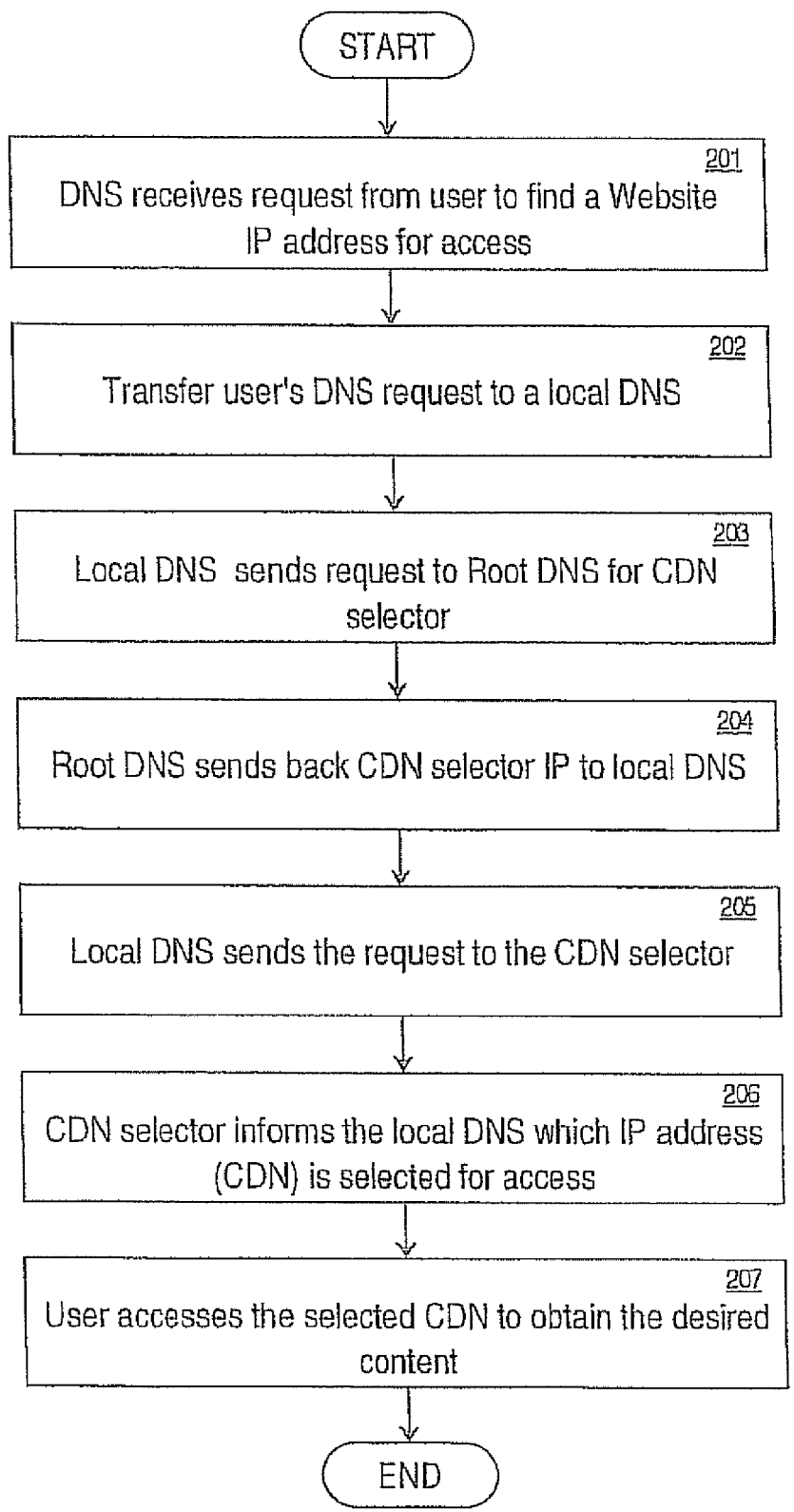
FIG. 2 shows a flowchart describing a CDN aggregator process according to one embodiment of the present invention.

FIG. 2 is a flowchart describing a CDN aggregator process according to one embodiment of the present invention. Initially, when a user clicks on a website link or enters in a URL into his or her web browser, the DNS receives the request from the user to find the website's IP address for access, step 201. The user's DNS request is transferred to a local DNS for handling, step 202. The local DNS sends the request to Root DNS for CDN selector, step 203. The Root DNS sends back CDN selector IP to local DNS, step 204. The local DNS sends the request to the CDN selector, step 205. The CDN selector informs the local DNS which IP address (CDN) is selected for access, step 206. The user accesses the selected CDN to obtain the desired content, step 207.

Figure 3:
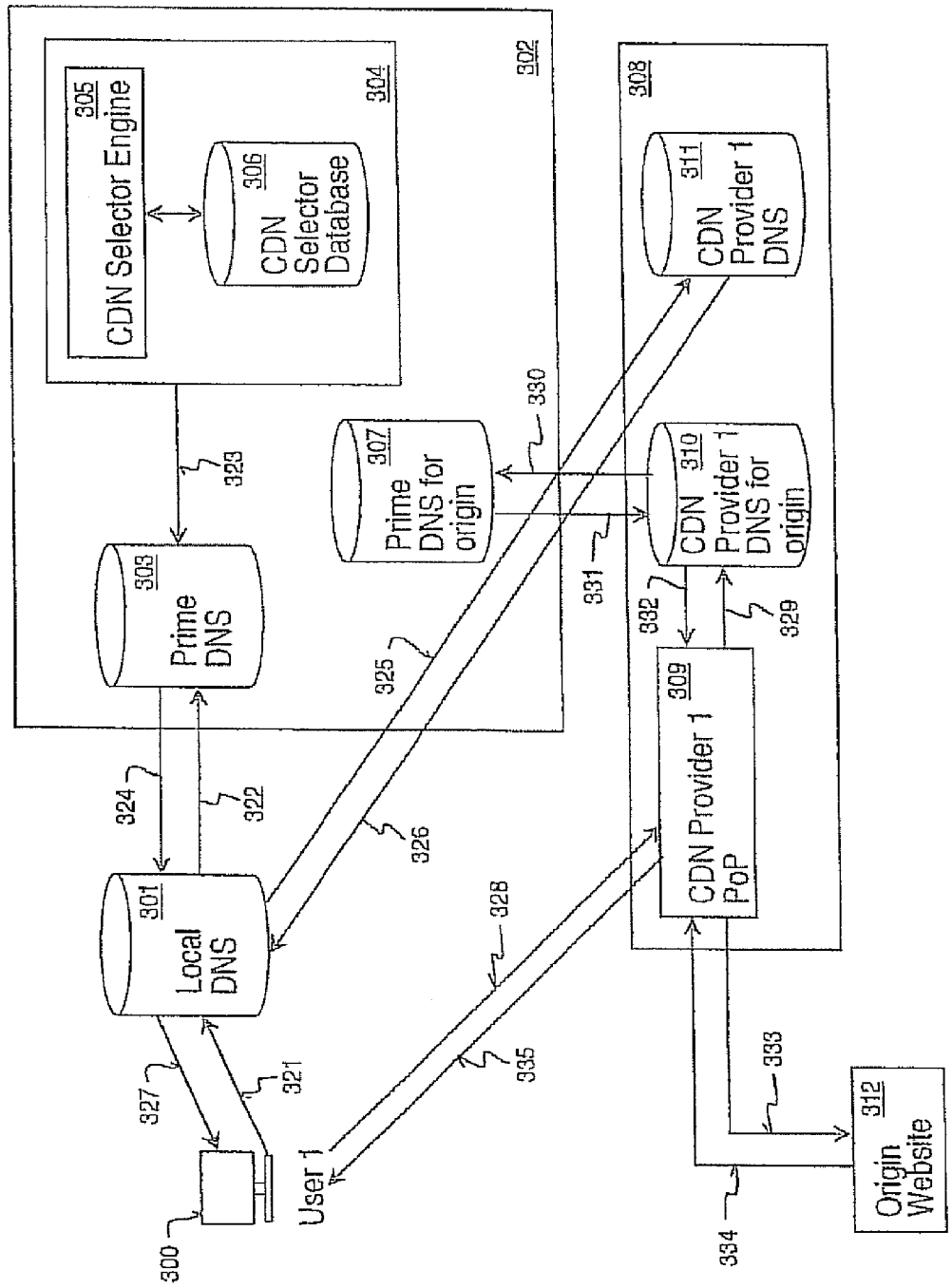
FIG. 3 shows an exemplary CDN aggregator system.

FIG. 3 shows an exemplary system that employs the use of a CDN aggregator. In this system, a user (e.g., user1) working on a personal computer, laptop, mobile browsing device, or any other client device 300, initiates an access to web content from an origin website 312. This is accomplished by the client computer 300 sending a DNS request 321 to a local DNS server 301 for the IP address of the origin website 312. An IP address is a numerical label assigned to devices according to the Internet Protocol. The local DNS server 301 checks its cache memory to find the requested IP address. If there is no match, the local DNS server 301 sends a request 322 to the CDN aggregator 302. CDN aggregator 302 is comprised of Prime DNS server 303, CDN selector 304, and Prime DNS for origin server 307. The CDN aggregator can be assigned any cname. In this example, the cname is called "Prime." The request 322 is received by the Prime DNS server 303.

A CDN selector 304 is used to select an appropriate CDN. The CDN selector 304 is comprised of CDN selector engine 305 and CDN selector database 306. Selector engine 305 is comprised of hardware (e.g., one or more microprocessors, application specific integrated circuits, memory devices, interfaces, etc.) running software that determines which one of the CDNs that are part of the CDN aggregator system that would be most optimal to service the request. The software considers information from multiple sources in selecting what is considered to be the most optimal CDN. Some information that may be useful include, but is not limited to, data found in the incoming IP packet (e.g., Source IP Address, Destination IP Address, Type of Service, Time to Live, Options, etc.). In addition, other data, such as data from network/traffic management systems; time of day; DNS coverage; real time logs; cost; ping time; network prediction models; feedback information; etc., can be used in the selection process. The selection process can take all or a combination of the data and apply an algorithm, set of rules, etc. to automatically select what is considered to be the most optimal CDN for handling that particular request. A CDN selector database 306 containing the domain names and/or IP addresses of the DNS servers (e.g., DNS servers 307, 320, and 321) of all the partner CDNs (e.g., CDNs 304-306) is coupled to the CDN selector engine 305. The domain name or IP address of the DNS server of the selected CDN is supplied by the database 306. In this example, provider1's CDN network 308 is selected as being the most optimal CDN. The CDN selector 305 selects and loads 323 the CDN provider1's cname to the Prime DNS server 303. The Prime DNS server 303 sends a response 324 to the local DNS server 301 with the cname.

Thereupon, the local DNS server 301 sends a request 325 to provider1's CDN network 308. Provider1's CDN network 308 is comprised of CDN provider1's DNS server 311, CDN provider1's DNS for origin server 310, and one or more of CDN Provider1's PoP server(s) 309. The request 325 is received by the CDN provider 1's DNS server 311. In response, the CDN provider1's DNS provides the IP address 326 corresponding to the CDN provider1's PoP server to the local DNS server 301. The local DNS server 301 forwards this IP address 327 to the client device 300. The aforementioned flows 321-327 are all DNS accesses. The next process is an HTTP request 328 that is sent by the client device 300 to the CDN provider1's PoP server 309. Upon receiving this request, the CDN provider1's PoP server 309 sends a DNS request 329 to the CDN provider1's DNS for origin server 310 in order to determine the IP address of the origin website 312. If there is no preconfigured origin website IP address stored in the CDN provider1's DNS for origin server 310, a DNS request 330 is sent to the Prime DNS for origin server 307. The Prime DNS for origin server 307 responds by transmitting the origin website's IP address 331 to the CDN provider1's DNS for origin server 310. The CDN provider1's DNS for origin server 301 forwards the origin website's IP address 332 to the CDN provider1's PoP server 309. It should be noted that the aforementioned flows 329-332 are all DNS accesses. Furthermore, flows 329-332 are but one of several different approaches to obtain the IP address of the origin website 312. Other approaches include, but are not limited to: preconfiguring it in the CDN provider1's origin DNS; obtaining the IP address from the Prime CDN aggregator 302 via an API; and preconfiguring the CDN provider1's PoP with the origin website IP address.

Once the CDN provider1's PoP server 309 receives the IP address of the origin website, it transmits an HTTP request 333 to the origin website 312. The origin website 312 responds to this HTTP request by providing the requested content 334 it is hosting to the CDN provider1's POP server 309. The CDN provider1's POP server 309 caches this content and transmits the content 335 to the client device 300. User1 now has access to view, listen, and/or interact with this content.

Figure 4:
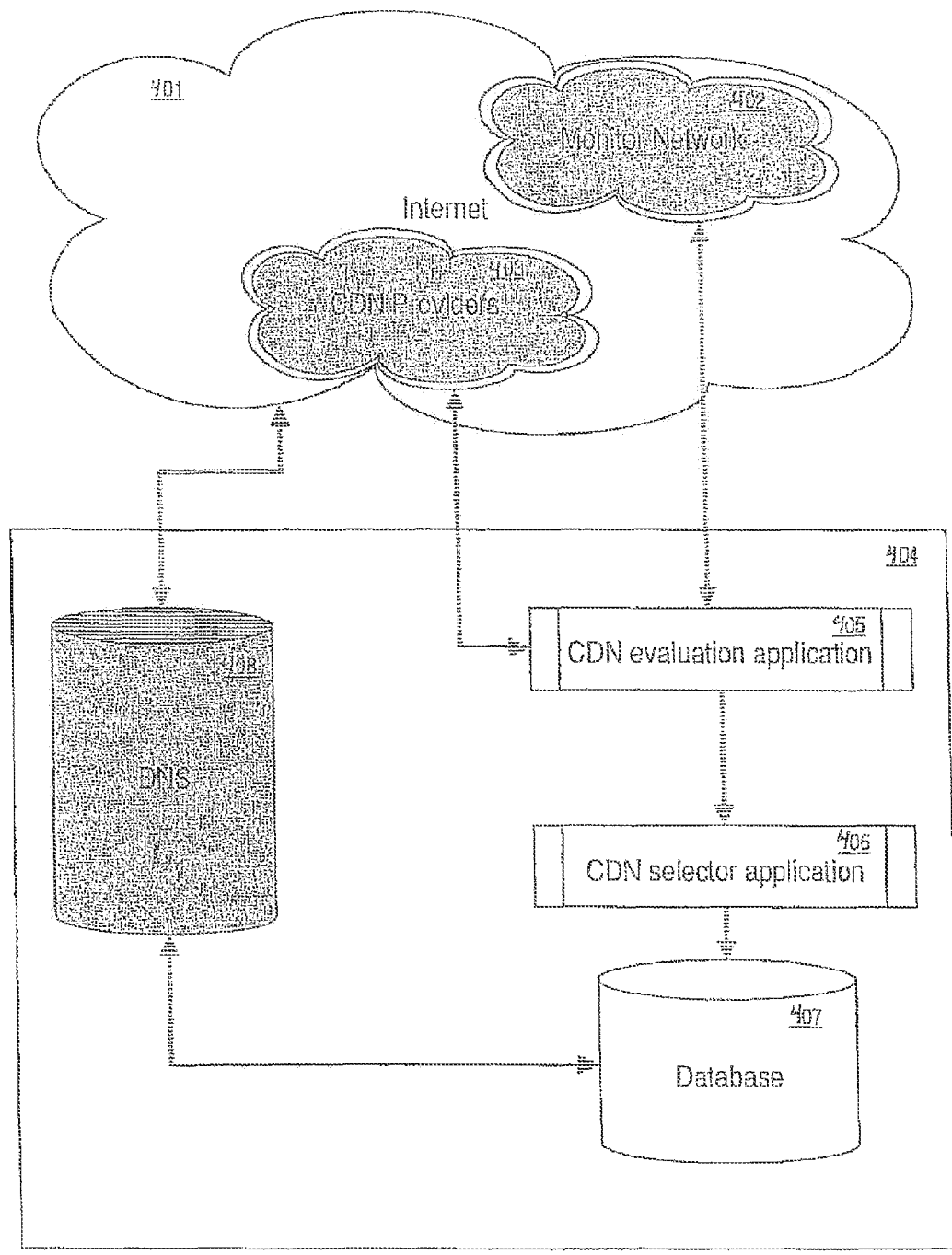
FIG. 4 shows an exemplary diagram of a CDN selector system.

FIG. 4 shows an exemplary diagram of a CDN selector system 404.

The CDN selector 404 is comprised of a multi-server and sub-system combination running customized selection software. The CDN selector 404 includes one or more DNS servers 408, a CDN evaluation application 405, a CDN selector application 406, and a database 407. The CDN evaluation application 405 evaluates the various partner CDN providers 403 accessible via Internet 401. Part of this evaluation process can take into account information provided by a monitor network 402, which provides real-time and historic data pertaining to Internet traffic conditions. The monitor network 402 may comprise a monitor and probes for determining network conditions, third-party monitoring services, and real-time traffic logs for monitoring each content delivery network. Network feedback information from the third-party monitoring services and/or real-time traffic logs may be used to adjust the results of the CDN selector application 406 for individual CDNs. The network feedback information enables the CDN selector application 406 to adapt to changing network conditions, as well as insuring that the monitor and probes are providing data that is accurately representative of end-user experiences. The real-time traffic logs create a log for each content delivery network, comprising a record of every transaction to the particular content delivery network comprising a trace of each content request and response. While the third-party monitoring services (e.g., commercially available from Gomez™ and Keynote™) provide objective end-user data representative of actual end-user experiences.

The CDN selector application 406 periodically calculates a performance value for each CDN. By comparing adjusted, forecasted, performance values for each CDN, as described below, an optimal CDN is identified. The CDN selector application 406 may also take into consideration the distances to the respective CDNs in terms of number of hops. Closer CDNs are favored over more distant CDNs. This performance value may also be a function of the packet (e.g., UDP, HTTP, FTP, etc.). Other variables (making up the performance value) that may be considered by the CDN selection application 406 include: ping time (i.e., latency), cost, a threshold in terms of lower and/or upper bandwidths, time of day, DNS coverage, etc. Variables that are evaluations of performance, such as latency, are provided by monitoring probes reporting to a monitor as part of the monitoring network 402.

One or more functions define which criteria or variable to consider and their respective relevancies. Such functions provide individual weighting for each performance variable. Additional functions provide a forecast of predicted performance values and network feedback information. For example, cost may be of more significance to one content provider but not to another content provider. Consequently, the selection function for the first content provider would weight the cost variable more heavily when determining an optimal CDN for selection. In a further example, certain content providers may desire all their content provided by a particular CDN up to a specified upper bandwidth threshold, whereupon the CDN selector will determine an optimal CDN for further content delivery after reaching the bandwidth threshold. In a final example, time of day may play a role in CDN availability and/or cost, such as seen in gaming and commercial business CDNs where excess bandwidth is available during school hours and after business hours, respectively. Furthermore, the CDN selector application 406 may customize the selection function for each individual content provider. The CDN selector application stores its results in a database 407. The results stored in database 407 are used by DNS servers 408 to direct requests to the appropriate CDN providers 403.

Figure 5:
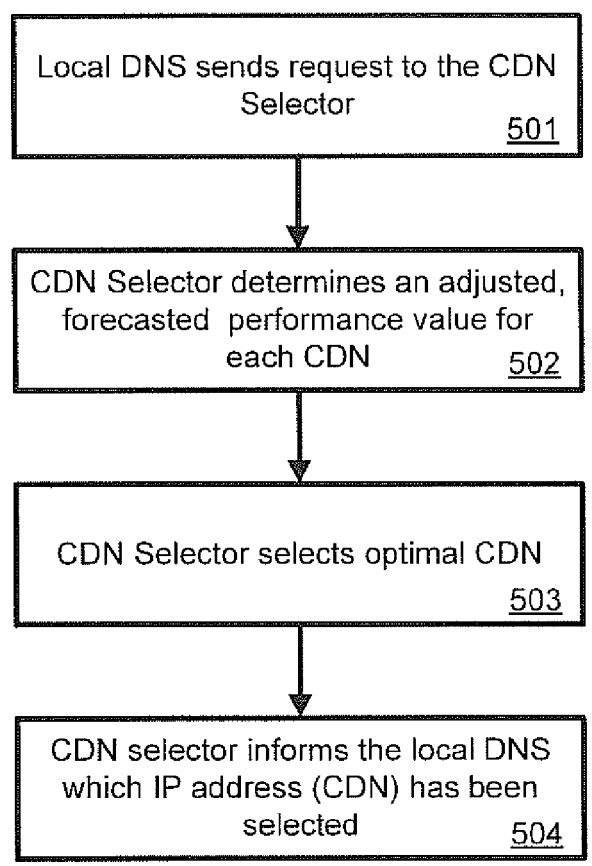
FIG. 5 shows a flowchart describing a CDN selection process according to one embodiment of the present invention.

FIG. 5 is a flowchart describing a CDN selector process according to one embodiment of the present invention. As stated above, when a user clicks on a website link or enters a URL into his or her web browser, the local DNS eventually sends the request from the user to find the website's IP address for access to the CDN selector, step 501. The CDN selector determines an adjusted, forecasted performance value for each CDN, step 502. The CDN selector selects the optimal CDN based upon the adjusted, forecasted performance value of each CDN, step 503. The CDN selector informs the local DNS which IP address (CDN) is selected for access, step 504.

In an exemplary embodiment, to determine an adjusted, forecasted performance value for a given CDN, the CDN selector performs three functions: a weighting function, a forecasting function, and a feedback function.

The CDN selector performs the first function:

$$F_1(V_1, V_2, V_3 \ldots V_N) = P_1$$

A performance value $P_1$ for a given CDN is determined as a function $F_1$ of a selected number of variables $V_1, V_2 \ldots V_N$ (e.g., packet function, latency, cost, a threshold in terms of lower and/or upper bandwidths, time of day, DNS coverage, etc.). $F_1$ is a weighting function. As discussed above, the weighting applied to any variable for any individual CDN may vary. For example, the weighting applied to a time of day variable for a CDN used in on-line gaming may be weighted such that the time of day variable is so heavily weighted in the evening that it will never be considered optimal. Further, the weighting may be adjusted so that a content provider's preferred CDN is always selected as a first option, unless another variable takes an unexpected precedence (e.g., DNS coverage deficiencies or upper bandwidth threshold limit exceeded).

In an exemplary embodiment a performance value $P_1$ is continuously determined every few minutes for each CDN. These accumulated performance values are applied to the second function:

$$F_2(P_1, P_2, P_3 \ldots P_{10}) = N_1$$

The second function $F_2$ determines a forecasted performance value $N_1$ as a function of the past hour's worth of performance values. In an exemplary embodiment, ten performance values are taken each hour, one every six minutes. Looking over the past hour's worth of performance values, the second function $F_2$ projects forward in time, using the past hour's worth of values to form a performance value trend with which to estimate the next future performance value: a forecasted performance value $N_1$. Therefore, with the most recent hour's worth of performance values $P_1$ always available, a forecasted performance value $N_1$ is easily determined.

The forecasted performance value $N_1$ is now applied to the third function:

$$F_3(N_1, \text{logs}, \text{third party monitoring results}) = N'_N$$

The third function $F_3$ applies network feedback information to the forecasted performance value $N_1$ from at least one of a pair of sources: real-time traffic logs and third party monitoring results (e.g., commercially available from Gomez™ and Keynote™). The network feedback information insures that the data supplied in the performance variables accurately represent or mimic the end user's actual experience. This network feedback information is necessary due to the limited availability of monitoring probes supplying data to the evaluation application. In other words, the number of probes and their deployment locations affect whether the data are representative of an end user's actual experiences. Moreover, because monitoring probes are limited, especially at the end-users, third party monitoring is necessary to receive an objective analysis of what is actually happening to the users. In response to this network feedback information, the functions may be adjusted by changing the weights to specific performance variables as needed. Therefore, feedback for particular networks, times, and content, may result in different weighting criteria being used, allowing the first function to be adjusted in response to the feedback. With an adjusted and forecasted performance value $N'_N$ for each prospective CDN, the optimal CDN will be selected.

In an exemplary embodiment, the functions used may be different for each service provider or customer depending on their needs or wants.

In an additional embodiment, the CDN selector as described above may be utilized in a traditional CDN. Such a CDN would have an intelligent DNS capable of selecting an optimal POP server based on the functions described above, as well as the network feedback information. In other words, the CDN would contain a POP server selector that functions the same as the CDN selector described above.

Thus, a CDN aggregation system has now been disclosed. Although illustrative embodiments of the invention have been described in detail herein with reference to the accompanying figures, it is to be understood that the invention is not limited to those precise embodiment. The invention is not limited to CDN's, but rather, encompasses a wide range of networks and network configurations. Furthermore, the embodiments described above are not intended to be exhaustive or to limit the invention to the precise forms disclosed. As such, many modifications and variations will be apparent. Accordingly, it is intended that the scope of the invention be defined by the following Claims and their equivalents.

What is claimed is:

1. A content delivery network aggregator system comprising a processor coupled to a memory operable to select one of a plurality of content delivery networks and provide content from a selected content delivery network to a user, wherein the content delivery network aggregator system further comprises:
   a content delivery network evaluator operable to:
      evaluate a performance of a respective content delivery network of the plurality of content delivery networks based on a weighting function of a plurality of performance variables, wherein the plurality of performance variables comprise variables defined by customized policies;
      determine a forecast future performance of the respective content delivery network based on a series of prior evaluated performances of the respective content delivery network; and
      adjust weight factors of the plurality of performance variables in the weighting function based on network feedback information provided by
      a monitor coupled to the content delivery network evaluator, wherein the monitor is operable to monitor Internet conditions,
   wherein the respective content delivery network comprises a plurality of content servers,
   wherein selection of one of the plurality of content delivery networks is based upon forecast future performances of the plurality of content delivery networks.

2. The content delivery network aggregator system of claim 1 further comprising a content delivery network selector operable to select between the plurality of content delivery networks to provide the content depending on particular users.

3. The content delivery network aggregator system of claim 2, wherein performance of the respective content delivery network is evaluated periodically.

4. The content delivery network aggregator system of claim 1, wherein the network feedback information comprises:
   a real-time traffic log comprising a log of every transaction to the particular content delivery network comprising a trace of each content request and response; and
   a third party monitoring service operable to provide real-time end-user Internet conditions of the particular content delivery network provided by the third party monitoring service.

5. The content delivery network aggregator system of claim 1, wherein the plurality of performance variables comprise at least one of ping time, packet function, monetary cost of utilizing the particular content delivery network, a threshold in terms of lower and/or upper bandwidths, time of day, distance information, and DNS coverage.

6. The content delivery network aggregator system of claim 1, wherein the respective content delivery network comprises a domain name server and a plurality of POP servers, wherein the domain name server is operable to select one of the plurality of POP servers to provide content to the user, wherein the selection of one of the plurality of POP servers is based upon an analysis of a plurality of performance variables for each of the plurality of POP servers.

7. The content delivery network aggregator system of claim 6 further comprising a POP server selector operable to select between the plurality of POP servers for providing the content depending on particular users.

8. The content delivery network aggregator system of claim 6 further comprising a POP server evaluator that evaluates the plurality of POP servers.

9. The content delivery network aggregator system of claim 8 further comprising a monitor coupled to the POP server evaluator operable to monitor Internet conditions used to evaluate the plurality of POP servers, wherein the monitor comprises a plurality of probes operable to monitor end-user Internet conditions.

10. The content delivery network aggregator system of claim 9, wherein the POP server selector selects a particular POP server based on a performance value of the selected POP server, wherein the performance value is based on the plurality of performance variables for each of the plurality of POP servers, wherein each performance variable for each POP server is first individually weighted and then adjusted by a network feedback comprising actual end user Internet conditions.

11. The content delivery network aggregator system of claim 10, wherein the network feedback comprises:
   a real-time traffic log comprising a log of every transaction to the particular POP server comprising a trace of each content request and response; and
   a third party monitoring service providing real-time end-user Internet conditions of the particular POP server provided by the third party monitoring service.

12. The content delivery network aggregator system of claim 6 wherein the plurality of performance variables for a particular POP server comprise at least one of ping time, packet function, monetary cost of utilizing the particular POP server, a threshold in terms of lower and/or upper bandwidths, time of day, distance information, and DNS coverage.

13. The content delivery network aggregator system of claim 10, wherein the performance value is a forecasted, future performance value.

14. A method for providing content through a network comprising:
   monitoring a plurality of content delivery networks to evaluate the plurality of content delivery networks;
   receiving a DNS request from a local DNS server that is coupled to a CDN selector through a database;
   selecting an IP address corresponding to a particular content delivery network from the plurality of content delivery networks, wherein selection of the particular content delivery network is based upon comparing forecast future performance values of the plurality of content delivery networks, wherein a respective forecast future performance value of a respective content delivery network is derived based on a series of prior evaluated performance values of the respective content delivery network, wherein a respective prior evaluated performance value is derived based on a weighting function of plurality of performance variables for the respective content delivery network, wherein weight factors of the weighting function are adjusted by a network feedback comprising actual end user Internet conditions, wherein the respective content delivery network comprises a plurality of content servers; and
   forwarding the IP address to the local DNS server.

15. The method of claim 14 further comprising applying an intelligent selection process to select an optimal content delivery network from the plurality of content delivery networks.

16. The method of claim 15 wherein the intelligent selection process further comprises analyzing the plurality of performance variables of each of the plurality of content delivery networks, the performance variables comprising at least one of: ping time, packet function, monetary cost of utilizing the particular content delivery network, a threshold in terms of lower and/or upper bandwidths, time of day, distance information, and DNS coverage.

17. The method of claim 14, wherein the network feedback comprises:
   a real-time traffic log comprising a log of every transaction to the particular content delivery network comprising a trace of each content request and response; and
   a third party monitoring service providing real-time end-user Internet conditions of the particular content delivery network provided by the third party monitoring service.

18. The method of claim 14, wherein the IP address forwarded to the local DNS server corresponds to a DNS server of the particular content delivery network that was selected.

19. The method of claim 14 further comprising storing IP addresses corresponding to domain name servers corresponding to the plurality of content delivery networks.

* * * * *